(12) United States Patent
Vyas

(10) Patent No.: US 10,859,062 B2
(45) Date of Patent: Dec. 8, 2020

(54) VILLANOVA ULTRA EFFICIENT VERTICAL WINDMILL SYSTEM AND METHOD

(71) Applicant: Trilok Vyas, Allentown, PA (US)

(72) Inventor: Trilok Vyas, Allentown, PA (US)

( * ) Notice: Subject to any disclaimer, the term of this patent is extended or adjusted under 35 U.S.C. 154(b) by 0 days.

(21) Appl. No.: 16/599,075

(22) Filed: Oct. 10, 2019

(65) Prior Publication Data

US 2020/0116123 A1    Apr. 16, 2020

Related U.S. Application Data

(60) Provisional application No. 62/744,074, filed on Oct. 10, 2018.

(51) Int. Cl.
| | |
|---|---|
| *F03D 9/00* | (2016.01) |
| *H02P 9/04* | (2006.01) |
| *F03D 3/00* | (2006.01) |
| *F03D 9/25* | (2016.01) |

(52) U.S. Cl.
CPC .............. *F03D 3/005* (2013.01); *F03D 9/25* (2016.05)

(58) Field of Classification Search
CPC .................................. F03D 3/005; F03D 9/25
See application file for complete search history.

(56) References Cited

U.S. PATENT DOCUMENTS

| | | | | |
|---|---|---|---|---|
| 9,011,096 B2* | 4/2015 | Su | ............ | F03D 3/067 416/111 |
| 2003/0030283 A1* | 2/2003 | Lusk | ............ | F03D 3/005 290/44 |
| 2009/0200883 A1* | 8/2009 | Halstead | ............ | H02K 7/09 310/90.5 |
| 2010/0133851 A1* | 6/2010 | Devitt | ............ | C23C 4/04 290/55 |
| 2013/0323056 A1* | 12/2013 | Su | ............ | F03D 3/067 416/9 |
| 2015/0369216 A1* | 12/2015 | Kisovec | ............ | F03D 3/068 290/44 |
| 2016/0097372 A1* | 4/2016 | Monaco | ............ | F03D 3/068 416/143 |

* cited by examiner

*Primary Examiner* — Tulsidas C Patel
*Assistant Examiner* — Thomas K Quigley
(74) *Attorney, Agent, or Firm* — Runyan Law; Charles Runyan

(57) ABSTRACT

A vertical windmill system which provides a vertical axis windmill designed to rotate vertically as opposed to horizontally in order to optimize power-generation. The windmill utilizes kinetic wind energy to its maximum extent in order to create sustainable energy. It ensures the generator is not slowed down as wind speed is reduced so the efficiency of harvesting wind energy is increased. As designed it offers a simplified means for improving the efficiency of windmills.

18 Claims, 5 Drawing Sheets

VILLANOVA ULTRA EFFICIENT VERTICAL WINDMILL SYSTEM AND METHOD

CROSS-REFERENCE TO RELATED APPLICATION(S)

The present application is related to and claims priority to U.S. Provisional Patent Application No. 62/744,074 filed Oct. 10, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of prime-mover dynamo plants of existing art and more specifically relates to wind prime-mover dynamo plants.

RELATED ART

Standard windmills are constructed using a horizontal axis and vertically-orientated blades similar in orientation to a conventional fan. While the windmill creates sustainable energy, the wind's kinetic energy may be underutilized in this traditional design. The wind can be underutilized due to a sudden change in wind direction. Also, the kinetic energy stored in the form of angular momentum can decrease significantly when there is no wind blowing, and the blades of the windmill creates more air-drag/resistance instead of creating energy. A suitable solution is desired.

U.S. Pat. No. 8,648,483 to Jonathan Haar relates to a vertical axis wind turbine system. The described vertical axis wind turbine system includes a lower wind speed vertical axis wind turbine operatively connected to a first electrical motor/generator and a higher wind speed vertical axis wind turbine operatively connected to at least one second electrical motor/generator. Electrical power from the first electrical motor/generator is directed to the at least one second electrical motor/generator and mag-lev system to cause the higher wind speed turbine to begin turning. A start-up assistance subsystem which acts like a local wind accelerator and produces a positive torque to assist in the start-up of a vertical axis wind turbine is also provided.

SUMMARY OF THE INVENTION

In view of the foregoing disadvantages inherent in the known wind prime-mover dynamo plant art, the present disclosure provides a novel ultra efficient vertical windmill system. The general purpose of the present disclosure, which will be described subsequently in greater detail, is to provide an efficient and effective vertical windmill system.

A vertical windmill system is disclosed herein, in a preferred embodiment the system comprising: a master-vertical-shaft; at least one frame; a plurality of a vertical windmill fin assemblies each including a vertical shaft (having a first-end; a second-end; and a length); a plurality of disks (each of the disks having an outer-diameter; a radius with a slot; and an inner-diameter); at least one plate; and bearings (to allow for smooth rotation). The vertical windmill system, as designed, includes the master-vertical-shaft; the at least one frame; and the plurality of a vertical windmill fin assemblies in function combination to provide efficient power generation.

The first-end and the second-end of the vertical shaft each comprise a cone-tip; wherein each of the cone-tips comprise ferromagnetic material. The at least one frame is aerodynamic and each comprises a plurality of magnets; wherein each of the cone-tips comprising the ferromagnetic material engage with a corresponding one of the plurality of magnets; the plurality of magnets minimize friction.

The plurality of the frames are mounted circumferentially about the master-vertical-shaft; wherein the at least one frame is arcuate and the master-vertical-shaft is oriented on and rotates about a vertical axis in a clockwise and alternately a counter-clockwise direction as dependent on a prevailing relative wind-direction. The at least one plate is able to rotate through an angle up to a maximum of ninety degrees (which may be limited in travel by stoppers). The plurality of disks are mounted perpendicularly onto the vertical shaft (the plurality of disks comprises exactly four of the disks on each vertical shaft in preferred embodiments). Each of the plurality of disks is formed (manufactured) such that the slot comprises a negative volume traveling (removed) between the inner-diameter and the outer-diameter. The at least one plate is located along a portion of the length of the vertical shaft between two top disks and two bottom disks, the at least one plate having a smaller mass than the disks; the at least one plate equal in mass to a total-mass of negative slot-volume-masses not present to properly distribute a center of mass. A method is also disclosed herein.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vertical windmill system, constructed and operative according to the teachings of the present disclosure.

The various embodiments of the present invention will hereinafter be described in conjunction with the appended drawings, wherein like designations denote like elements.

DETAILED DESCRIPTION

Figure 1:
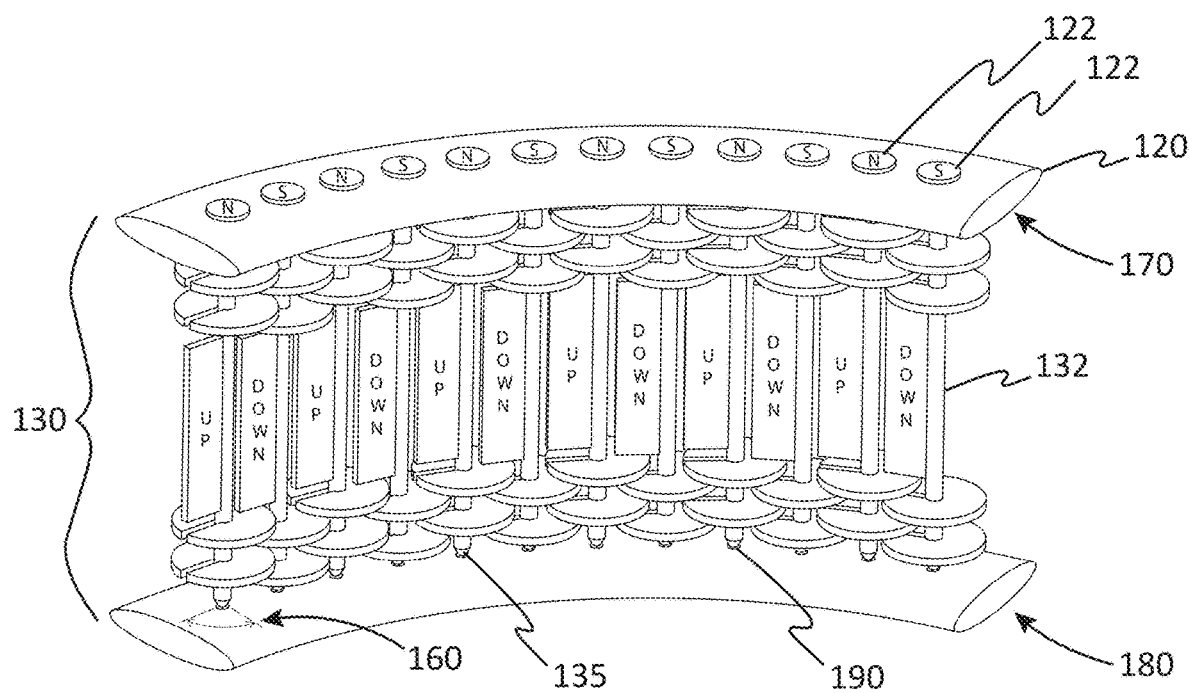
FIG. 1 is a 3D image of a single blade-portion with 12 fins and its components, according to an embodiment of the disclosure.

As discussed above, embodiments of the present disclosure relate to prime-mover dynamo plants and more particularly to a vertical windmill system as used to improve the efficiency of wind power generation.

Generally speaking, Villanova Ultra Efficient Vertical Windmill is a windmill used to maximize energy generation without slowing down the generator in case if the wind speed decreases. The vertical shaft rotates vertically (on a vertical axis) as opposed to horizontally in most common types of 3-blade horizontal-axis windmills. It may comprise multiple (e.g. 6 to 12, more or less are envisioned) "blades". Each "blade" is a curved frame structure, having a top and a bottom curved flat/aerodynamic surface. Each such blade contains multiple "fins". Each such "fin" is the same in construction, and contributes to the ultimate efficiency of the machine. The success of the design heavily depends upon the successful production of the "fins".

Fin-design-details: A "fin" is made up of a thin vertical shaft of radius 'r' ('r'>='t'/1) ending with cone shaped tapered points/pivots that can easily glide/rotate in the "sockets" on the top and bottom surfaces of the "blade" frame. These cone shaped endings are preferably of a magnetic material for lowering friction in the "blade's" bottom-sockets (using permanent-magnets on the top-surface of the "blades" to lower effective-weight of the "fins"). It also comprises of even number 'N' (N=2, 4, 6 etc.; shown N=4) small (relatively heavy) disks of uniform density 'raw2' each of thickness 't' and outer radius 'R'. Also attached is a much lighter rectangular "plate" of uniform density 'raw1' with dimensions 't'×'H'×('R'−'r'). The disks are separated by a distance (2×'B') where 'B' is around (3×'t'). 'N'/2 "disks" are on one side of the "plate", and other 'N'/2 are on its other side. On one side (called "UP" configuration), the nearest "disk's center" to the "plate's side" is 2×'B' units away. On the other side (called "down" configuration), the nearest "disk's center" to the "plate's side" is only 'B' units away. The ratio of the "plate's" height 'H' to its width w=('R'−'r') is preferably around 10:1 (i.e. 'H'/{'R'−'r'}=~10). However, this can be adjusted as needed. The thickness 't' should be as small as possible. Also, the "disks" are not continuous, but with a "slot" of thickness 't' "exactly aligned" with the "plate". The idea is that, the weight of the "plate" should be equal to the total weight of the missing-portion of the 'N' "slots" of all ('N') disks combined. This way the center of mass lies on the vertical-axis of the fin, which is of great significance for the proper operation of the present invention. The center-of-mass must lie on the vertical axis of the "fin". The relation between the densities of the "plate" and the "disk" materials is given by: 'raw2'=('raw1'×'H')/('N'×'t'). For example, for H=50 cm., t=1 cm, N=4, 'raw2'/'raw1'=50/(4×1)=12.5. The total height of the vertical shaft (excluding the end cone-shaped portion) can be given as: 'H'+('N'+1)×(2×'B').

Blade-design-details: A "blade" is made up of multiple "fins". Each adjacent "fin" is preferably separated by the distance ('R'+'r'+'t') between their vertical axes. Without any restrictions, the fins can rotate full 360-degrees about their vertical axes. However, there should be some way to restrict their movements so that they are allowed to rotate only up to 90-degrees leading to only 2 extreme-positions "open" and "close". The method to restrict the rotation to only 90-degrees can be accomplished by any suitable stopper mechanism. All odd-numbered "fins" are in the "up" position (e.g. f1, f3, f5 and so on). All even-numbered "fins" should be in the "down" position. The upper frame/surface of the "blade" preferably has magnets to "pull" the (magnetic cone part of the) "fins" from top, thereby reducing friction at the bottom bearing/pivot/socket. When the "fins" are in the "close" position, they absorb the wind's kinetic energy to produce the motion of the windmill. When the "fins" are in the "open" position, they allow the wind to pass through the blade by offering the least-resistance to the wind.

Referring now more specifically to the drawings by numerals of reference in more detail, there is shown in FIGS. 1-5, various views of a vertical windmill system 100.

Figure 2:
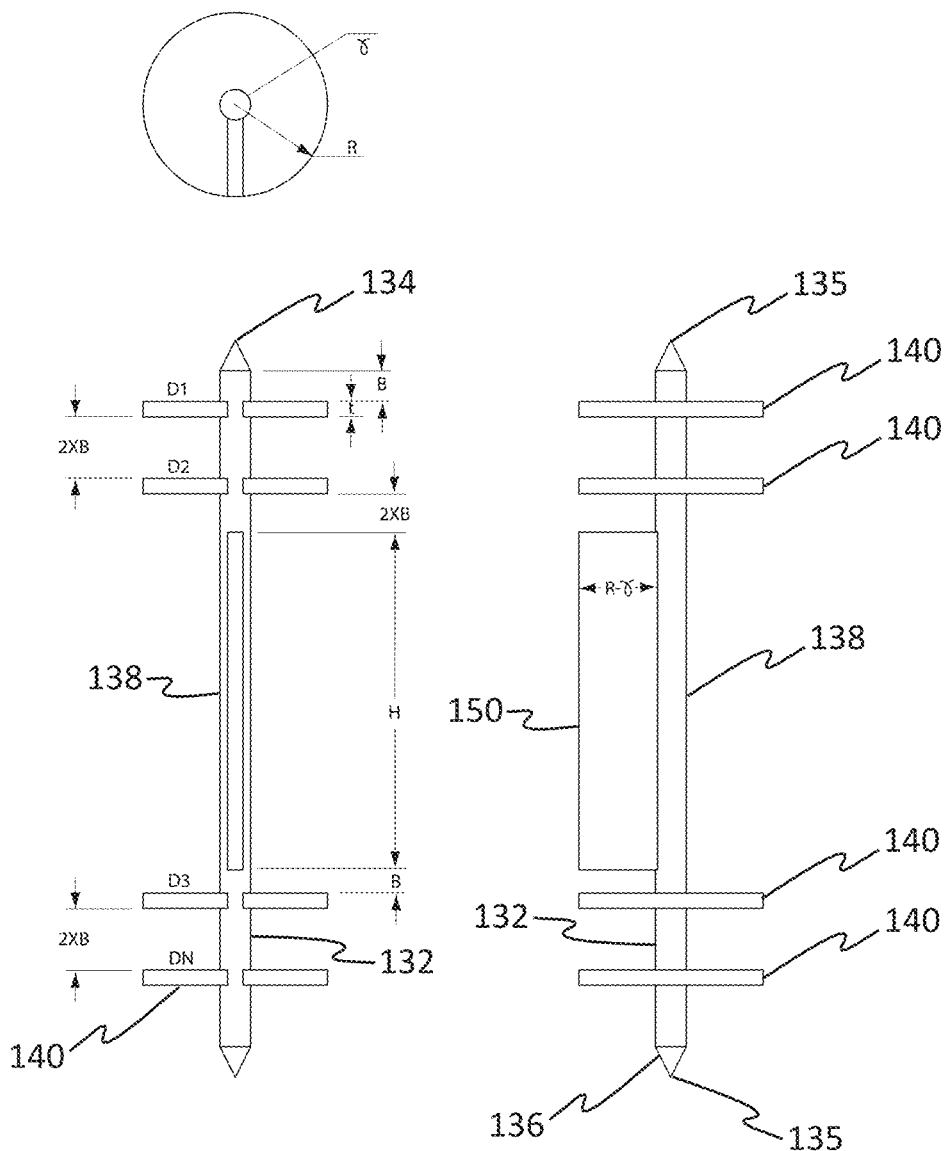
FIG. 2 is an orthographic projection of two "FINS" of the vertical windmill system of FIG. 1, according to an embodiment of the present disclosure.
Figure 3:
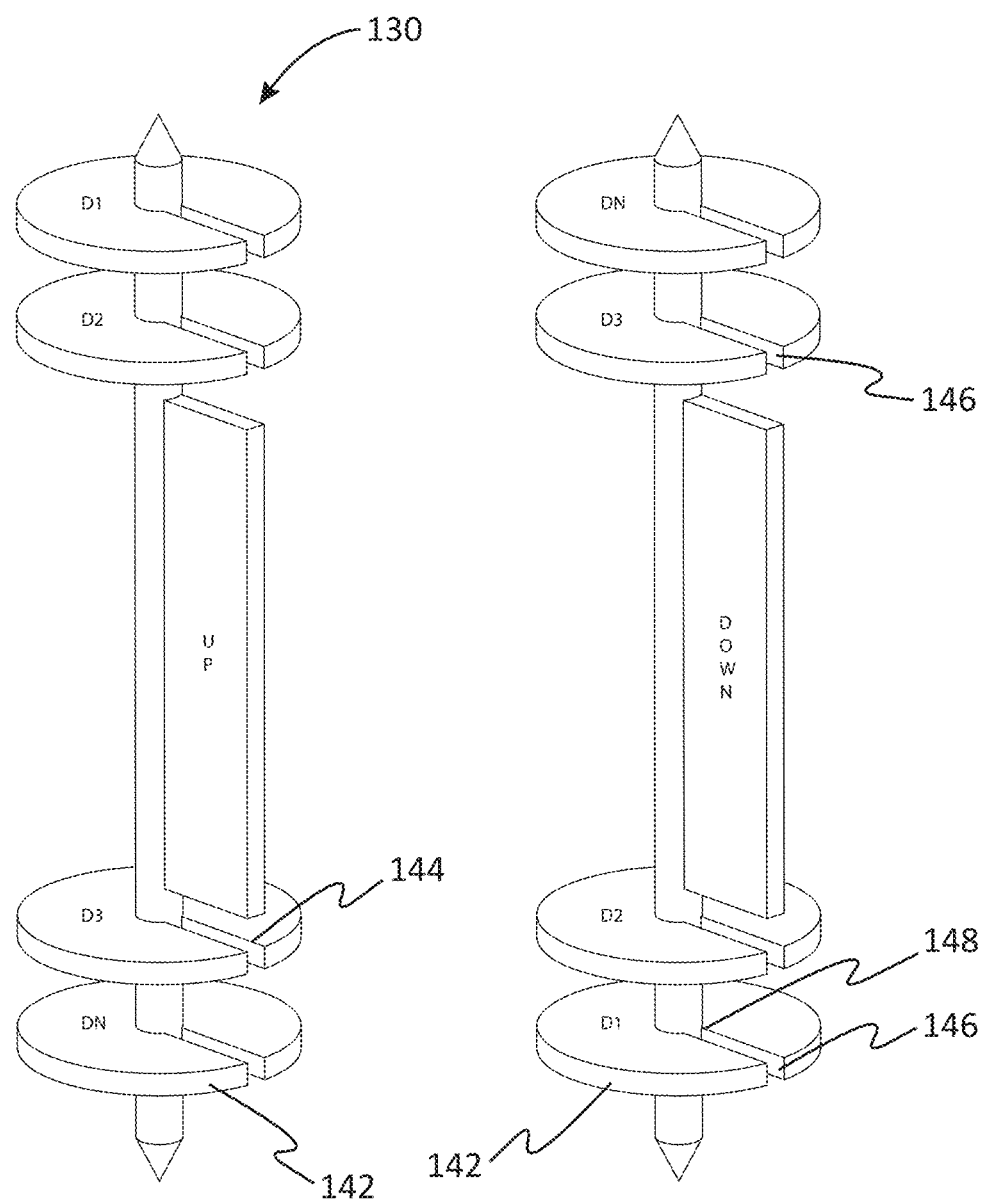
FIG. 3 is an isometric (3D) projection of two "FINS" of the vertical windmill system of FIG. 1, according to an embodiment of the present disclosure.
Figure 4:
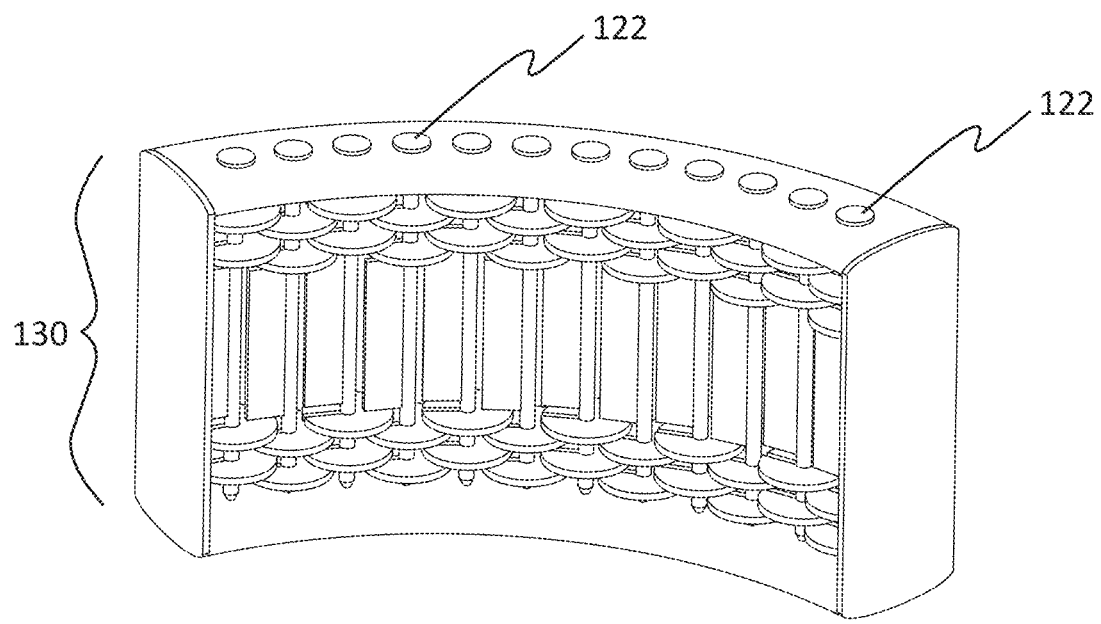
FIG. 4 is a perspective view of one of the vertical windmill fin assemblies of the vertical windmill system of FIG. 1, according to an embodiment of the present disclosure.
Figure 5:
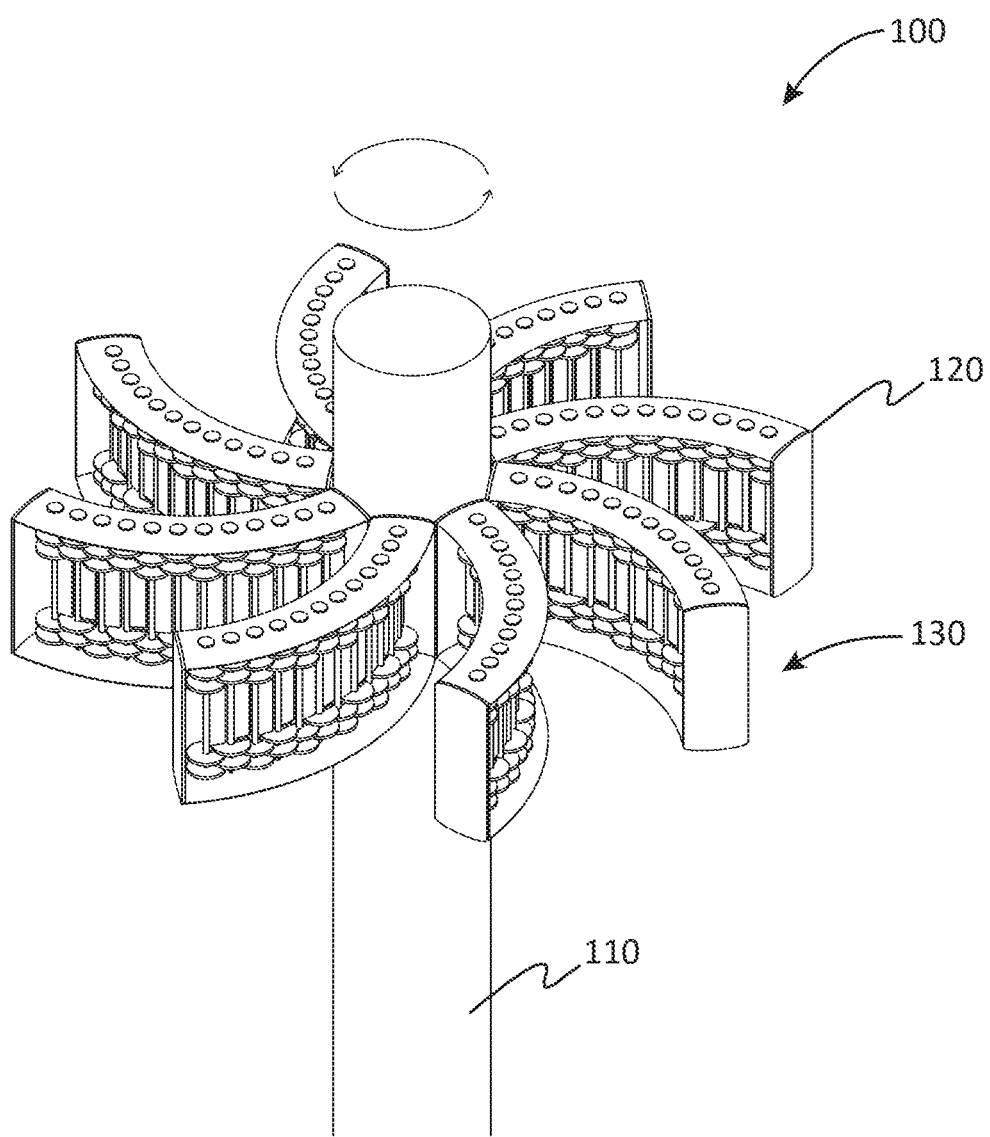
FIG. 5 is a 3D image of the final structure of the windmill with 8 blades attached on a vertical shaft, according to an embodiment of the present disclosure.

FIGS. 1-5 show various views of a vertical windmill system 100, according to an embodiment of the present disclosure. Here, the vertical windmill system 100 may be beneficial for use by a user to create efficient wind energy harvesting and generation of power for use. More specifically, FIG. 1 shows a 3D image of a single blade-portion with 12 fins and its components; FIG. 2 shows an orthographic projection of two "FINS" and FIG. 3 shows an isometric (3D) projection of two "FINS". FIG. 4 shows a perspective view of one of the vertical windmill fin assemblies. FIG. 5 shows a 3D image of the final structure of the windmill with 8 blades attached on a vertical shaft.

As illustrated, the vertical windmill system 100 may include a master-vertical-shaft 110; at least one frame 120; a plurality of a vertical windmill fin assemblies 130 each including a vertical shaft 132 having a first-end 134; a second-end 136; and a length 138; a plurality of disks 140, each of the disks 140 having an outer-diameter 142; a radius 144 with a slot 146; an inner-diameter 148; at least one plate 150; and as such the vertical windmill system 100 includes the master-vertical-shaft 110; the at least one frame 120; and the plurality of a vertical windmill fin assemblies 130 in function combination to provide power generation.

Referring now to the first-end 134 and the second-end 136 of the vertical shaft 132; the first-end 134 and the second-end 136 of the vertical shaft 132 of the vertical windmill system 100 each comprise a cone-tip 135; wherein each of the cone-tips 135 preferably comprise ferromagnetic material. The plurality of magnets 122 minimize friction and each of the cone-tips 135 comprising the ferromagnetic material engage with a corresponding one of the plurality of magnets 122. The at least one frame 120 is aerodynamic and each comprises a plurality of magnets 122; and the plurality of frames 120 are each mounted circumferentially about the master-vertical-shaft 110. The at least one frame 120 is arcuate, as shown. Frame 120 may be divided into upper strut 170 and lower strut 180. Each of upper strut 170 and lower strut 180 may have sockets 190 arrayed along one side. Upper strut 170 and lower strut mirror each other as illustrated, and the vertical shafts 132 span between them such that each first-end 134 rests in a socket 190 of upper strut 170 and each second-end 136 rests in a socket 190 of lower strut 180. As designed, the master-vertical-shaft 110 is able to rotate in a clockwise direction as dependent on a prevailing relative wind-direction and the master-vertical-shaft 110 is able to rotate in a counter-clockwise direction also dependent on a prevailing relative wind-direction (thereby increasing efficiency of use). The master-vertical-shaft 110 is oriented on and rotates about a vertical axis. Angular rotation of the vertical shaft 124 may be limited by stopper 160.

The least one plate 150 is able to rotate through an angle up to a maximum of ninety degrees in preferred embodiments as shown by the envelope of possible travel being limited by stoppers. Relationally speaking, the plurality of disks 140 are mounted perpendicularly onto the vertical shaft 132; wherein the plurality of disks 140 preferably comprises exactly four of the disks 140 located on each vertical shaft 132; disks 140 oriented perpendicular to the vertical shaft 132. The at least one plate 150 is located along a portion of the length 138 of the vertical shaft 132 between two top disks 140 and two bottom disks 140, as shown. The at least one plate 150 has a smaller mass than the disks 140; the at least one plate 150 equal in mass to a 'total-mass' of the negative slot-volume-masses not present to properly distribute a center of mass such that the device runs in a balanced condition. Bearings or other suitable means for minimizing friction are used within the present invention to allow for smooth and efficient rotation.

According to one embodiment, the vertical windmill system 100 may be arranged as a kit. In particular, the vertical windmill system 100 may further include a set of instructions. The instructions may detail functional relationships in relation to the structure of the vertical windmill system 100 such that the vertical windmill system 100 can be installed, used, maintained, or the like, in a preferred manner.

A method of use for vertical windmill system 100 may include one or more components or features of the vertical windmill system 100 as described above. As illustrated, the method for using the vertical windmill system 100 may include the steps of: step one providing a vertical windmill system as disclosed herein; step two installing the vertical windmill system; step three generating power from harvested energy caused by vertical rotation; wherein the vertical windmill system is able to rotate in clockwise and counter-clockwise directions.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for installation, use and repair of the vertical windmill system 100, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vertical windmill system, the system comprising:
a master-vertical-shaft;
a plurality of a vertical windmill fin assemblies arrayed radially about the master-vertical-shaft, each of the plurality of vertical windmill fin assemblies including
a frame having
an upper strut,
a lower strut,
sockets arrayed along each of the upper strut and the lower strut,
each of the upper strut and the lower strut being defined by a curvature,
a plurality of vertical shafts arranged along the curvature of the upper strut and the lower strut, each of the plurality of vertical shafts having
a first-end insertable into and rotatable within a socket of the upper strut;
a second-end insertable into and rotatable within a socket of the lower strut; and
a length;
a plurality of disks, each of said disks circumscribing one of the plurality of shafts, each of said disks having
an outer-diameter;
a radius with a slot; and
an inner-diameter;
at least one plate affixed to and radially extending from each of the plurality of vertical shafts; and
wherein said vertical windmill system includes said master-vertical-shaft; said frame; and said plurality of a vertical windmill fin assemblies in function combination to exert rotation upon an electrical power generation machine.

2. The vertical windmill system of claim 1, wherein said first-end and said second-end of said vertical shaft each comprise a cone-tip.

3. The vertical windmill system of claim 2, wherein each of said cone-tips comprise ferromagnetic material.

4. The vertical windmill system of claim 3, wherein said frame is aerodynamic and each comprises a plurality of magnets.

5. The vertical windmill system of claim 1, wherein the master-vertical-shaft is able to rotate in a clockwise direction as dependent on a prevailing relative wind-direction.

6. The vertical windmill system of claim 1, wherein the master-vertical-shaft is able to rotate in a counter-clockwise direction as dependent on a prevailing relative wind-direction.

7. The vertical windmill system of claim 1, wherein the at least one plate is able to rotate through an angle up to a maximum of ninety degrees, each of the plurality of rotating vanes being rotationally limited by a stopper.

8. The vertical windmill system of claim 4, wherein the plurality of magnets minimize friction.

9. The vertical windmill system of claim 8, wherein each of the cone-tips comprising said ferromagnetic material engage with a corresponding one of said plurality of magnets.

10. The vertical windmill system of claim 1, wherein the master-vertical-shaft is oriented on and rotates about a vertical axis.

11. The vertical windmill system of claim 10, wherein the plurality of disks are mounted perpendicularly onto said vertical shaft.

12. The vertical windmill system of claim 11, wherein the plurality of disks comprises exactly four of said disks.

13. The vertical windmill system of claim 12, wherein the at least one plate is located along a portion of said length of said vertical shaft between two top said disks and two bottom said disks, said at least one plate having a smaller mass than said disks, said at least one plate equal in mass to a total-mass of negative slot-volume-masses not present to properly distribute a center of mass.

14. The vertical windmill system of claim 1, further comprising bearings.

15. A vertical windmill system, the system comprising:
a master-vertical-shaft;
a plurality of a vertical windmill fin assemblies arrayed radially about the master-vertical-shaft, each of the plurality of vertical windmill fin assemblies including
a frame having
an upper strut,
a lower strut,
sockets arrayed along each of the upper strut and the lower strut,
each of the upper strut and the lower strut being defined by a curvature,
a plurality of vertical shafts arranged along the curvature of the upper strut and the lower strut, each of the plurality of vertical shafts having
a first-end insertable into and rotatable within a socket of the upper strut;
a second-end insertable into and rotatable within a socket of the lower strut; and
a length;
a plurality of disks, each of said disks circumscribing one of the plurality of shafts, each of said disks having
an outer-diameter;
a radius with a slot; and
an inner-diameter;
at least one plate affixed to and radially extending from each of the plurality of vertical shafts; and
wherein said vertical windmill system includes said master-vertical-shaft; said frame; and said plurality of a vertical windmill fin assemblies in function combination to exert rotation upon an electrical power generation machine;
wherein said first-end and said second-end of said vertical shaft each comprise a cone-tip;
wherein each of said cone-tips comprise ferromagnetic material;
wherein said frame is aerodynamic and each comprises a plurality of magnets;
wherein each of the cone-tips comprising said ferromagnetic material engage with a corresponding one of said plurality of magnets;
wherein the master-vertical-shaft is oriented on and rotates about a vertical axis;
wherein the master-vertical-shaft is able to rotate in a clockwise and alternately a counter-clockwise direction as dependent on a prevailing relative wind-direction;
wherein the at least one plate is able to rotate through an angle up to a maximum of ninety degrees;
wherein the plurality of magnets minimize friction;
wherein the plurality of disks are mounted perpendicularly onto said vertical shaft;
wherein the plurality of disks comprises exactly four of said disks on each said vertical shaft;
wherein each of said plurality of disks is formed such that said slot comprises a negative volume traveling between said inner-diameter and said outer-diameter; and
wherein the at least one plate is located along a portion of said length of said vertical shaft between two top said disks and two bottom said disks, said at least one plate having a smaller mass than said disks, said at least one plate equal in mass to a total-mass of negative slot-volume-masses not present to properly distribute a center of mass.

16. The vertical windmill system of claim 15, further comprising set of instructions; and
wherein the vertical windmill system is arranged as a kit.

17. A method of use for the vertical windmill system, the method comprising the steps of:
providing the vertical windmill system of claim 1;
installing said vertical windmill system; and
generating power from harvested energy caused by the rotation of the master-vertical-shaft.

18. The method of claim 17, wherein the vertical windmill system is able to rotate in clockwise and counter-clockwise directions.

* * * * *